United States Patent [19]

LeVert

[11] Patent Number: 4,805,454
[45] Date of Patent: Feb. 21, 1989

[54] CONTINUOUS FLUID LEVEL DETECTOR

[76] Inventor: Francis E. LeVert, 1909 Matthew La., Knoxville, Tenn. 37923

[21] Appl. No.: 895,284

[22] Filed: Aug. 11, 1986

[51] Int. Cl.$^4$ ............................................. G01F 23/22
[52] U.S. Cl. ...................................... 73/295; 374/179; 136/237; 136/233
[58] Field of Search ............. 73/295, 304 R; 340/622; 374/179; 376/247, 258; 136/232, 233, 237; 137/392

[56] References Cited

U.S. PATENT DOCUMENTS

| | | | |
|---|---|---|---|
| 3,161,050 | 12/1964 | Exner | 73/295 |
| 3,485,100 | 12/1969 | Petersen | 73/295 |
| 3,783,691 | 1/1974 | Arlaud | 136/233 |
| 4,324,138 | 4/1982 | Davis et al. | 374/137 |
| 4,377,550 | 3/1983 | Tokarz | 376/258 |
| 4,418,035 | 11/1983 | Smith | 376/258 |
| 4,592,230 | 6/1986 | Waring et al. | 73/295 |
| 4,603,580 | 8/1986 | Waring | 73/295 |
| 4,625,200 | 11/1986 | Hilborn | 374/179 |
| 4,638,107 | 1/1987 | Davis | 136/237 |
| 4,647,710 | 3/1987 | Davis | 136/237 |

FOREIGN PATENT DOCUMENTS

| | | | |
|---|---|---|---|
| 0047423 | 4/1980 | Japan | 374/179 |
| 0006116 | 1/1981 | Japan | 73/295 |

Primary Examiner—William A. Cuchlinski, Jr.
Assistant Examiner—Thomas B. Will

[57] ABSTRACT

A level measuring device comprises an electrical heater, a metallic sheathed thermocouple cable with two thermoelectric elements, a negative temperature coefficient electrical insulant interpositioned between each thermoelectric element and the sheath material of the thermocouple cable such that the thermoelectric elements are not mechanically in contact with each other; an outer cylindrical metallic sheath with one closed and one open end wherein the resistance heater and thermocouple cable are contained; a constant current power supply and a digital millivoltmeter connected to the ends of thermoelectric elements protruding from open end of the outer cylindrical metallic sheath for measuring the loop resistance of the thermoelectric elements; a microprocessor system for computing a length of cable corresponding to the resistance measured using the constant current source and the digital millivoltmeter; and, a power supply for supplying an electrical current to the heater cable. The electrical resistance heater cable supplies thermal energy to the thermocouple cable along its length. When a length of the thermocouple cable becomes uncovered due fluid level changes, the uncovered thermocouple cable, which is being heated by the heater, increases in temperature. As the uncovered thermocouple cable increases in temperature, a conductive path results in a temporary junction through which the loop resistance between the two exposed ends of the thermocouple cable can be measured. This loop resistance is then used to compute the distance to the temporary junction and thereby provide one with a continuous measure of a substance in a closed vessel.

4 Claims, 2 Drawing Sheets

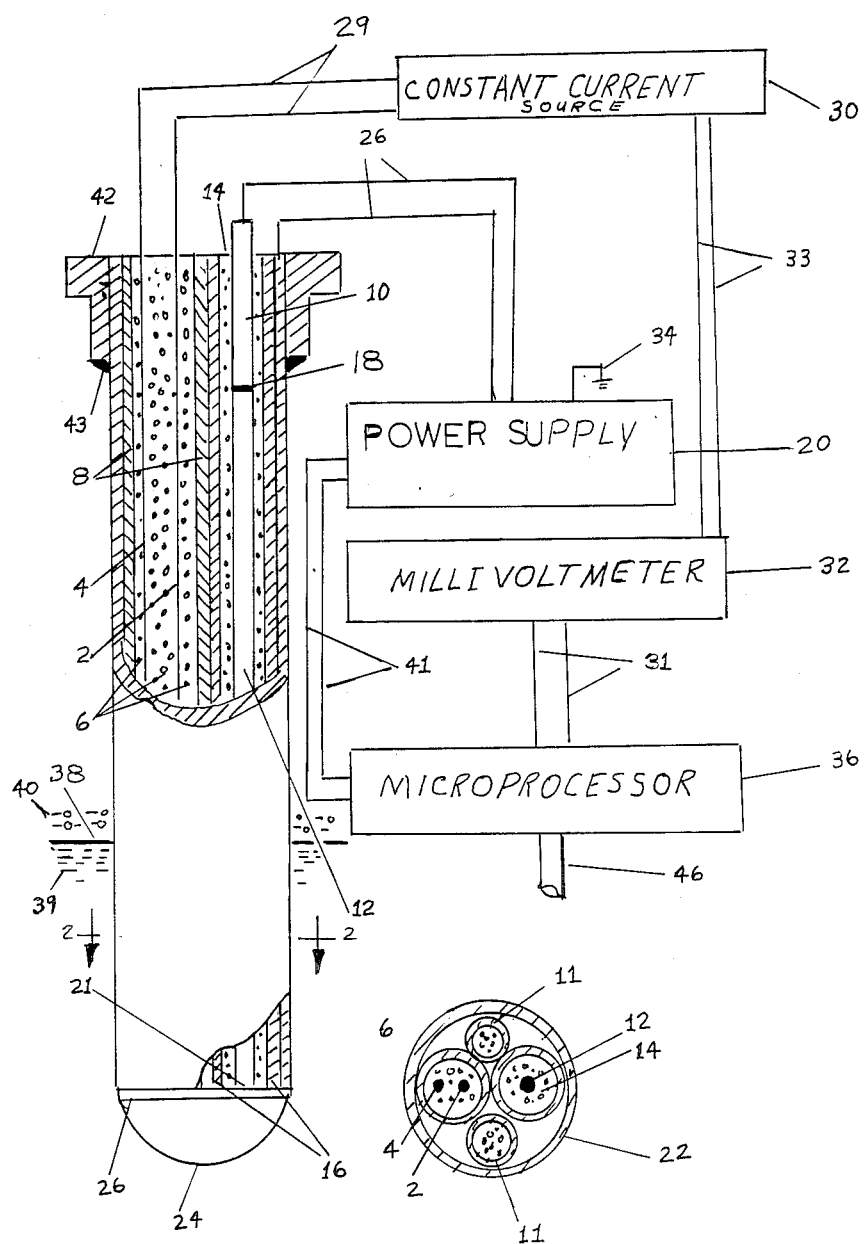

CONTINUOUS FLUID LEVEL DETECTOR

BACKGROUND OF THE INVENTION

This invention relates to the detection of the level of a substance in a closed tank. In particular, this invention is an improvement on the art of thermal level sensing devices, in that, it is an active integral unit that provides a continuous indication of level in a closed vessel.

One of the many techniques used to provide information on the level of a substance in a closed vessel with a liquid and a gas is based on the differences beween the fluids thermal characteristics. The thermal characteristics of fluids used to infer the level of the liquid in a tank are either temperature or thermal conductivity. Temperature probes measure the vertical temperature profile in the vessel and this information is used to infer the level of liquid in the vessel. Most systems based on the difference in thermal conductivities between two fluids are employed as fixed-point level sensors. These systems generally consist of electrically heated thermistors or thermocouples inserted into a vessel. In the case of thermistors, the temperature and, consequently, their electrical resistance, increase as the thermal conductivity of the fluid, at the level of a given thermistor, in which it is immersed in decreases. This increase in temperature is then used to infer the lack of fluid at the level of the thermistor evidenced by an increasing temperature value. In those systems that utilize thermocouples, the electrical heat is supplied by a separate electrical resistance heater juxtaposed next to in contact with the thermocouples which heats the thermocouples to a given equilibrium temperature. When the conductivity of the fluid surrounding the location of the thermocouple changes there is a corresponding increase in the millivolt output of the thermocouple. This change in the output of the thermocouple is used to indicate the level of the fluid in a tank.

U.S. Pat. No. 4,418,035, entitled "Coolant Condition Monitor For Nuclear Power Reactors," issued in 1981 to R. D. Smith consisted of a plurality of sheathed thermocouples arranged circumferential around a sheathed resistance heater, all of which were inserted in a pair of concentric steel tubes. The system being mechanically deformed such that all components are in good mechanical contact with each other. This conductivity monitor, because of its design can only detect the level of the fluid in which it is immersed at distinct locations along the monolithic unit. These devices are well suited as point level detectors for liquid-vapor interfaces, as the thermal conductivity of liquids is markedly higher than that of vapors. However, they can not provide a continuous indication of the level in a closed system.

The U.S. Pat. No. 4,418,035 provides information about the location of an interface between a fluid and the vapor above it at discrete locations. It should be noted, however, that the ability of the invention to resolve the location is limited by the number of sensors positioned latitudinally along the cylindrical probe. Level measuring devices which use resistance thermometers have this same limitation. It is desirable to overcome this drawback by providing a cylindrical level sensor which provides a continuous indication of the position of the interface between a fluid and a vapor, a solid and air or two fluids with different thermal conductivities. Level sensors of this type are useful when it is necessary to precisely control the level of a substance in a closed tank without recourse to the use of a cylindrical level indicator with a multiplicity of temperature sensors arrayed in an axial direction either exposed to the fluid or protected from it with a protective metallic sheath.

It is therefore an object of the present invention to provide an improved detector of fluid level in a closed tank.

It is a further object of the present invention to provide a continuous detector of level in a vessel. Other objects will be apparent in the course of a detailed description of the invention.

SUMMARY OF THE INVENTION

A detector of liquid level in a closed tank comprises an elongated metallic sheath wherein two different thermoelectric elements imbedded in a negative temperature coefficient insulant that electrically separate the thermoelectric elements from each other and the elongated metal sheath (hereafter referred to as thermocouple cable); a sheathed resistance heater cable; and, a cylindrical metal sheath which encases the thermocouple cable and the electrical resistance heater. The sheaths of the resistance heater and the thermocouple cable are in good thermal contact with each other. The cylindrical metal sheath is swaged onto the thermocouple-heater cable pair over the active length of the level sensor that is exposed to the fluid and vapor in the tank. When the apparatus is placed in a vessel containing a fluid and a vapor, with the heater activated, the insulant separating the two thermoelectric leads, because of its negative temperature coefficient, is driven into a conductive state thereby forming a temporary junction at the interface between the fluid and vapor. A measure of the loop resistance of the two leads to the point of the temporary junction provides one with a means of estimating the distance to the location of the temporary junction. Once the temporary junction is formed, the thermoelectric elements of the thermocouple cable become a temperature sensor whose value can be used to provide a temperature value for a temperature versus resistance look-up table that provides a resistance per unit length value to be used in estimating the distance to the temporary junction or the fluid level.

BRIEF DESCRIPTION OF THE DRAWINGS

FIG. 1 is a sectional side view of an apparatus for the practice of the present invention.

FIG. 2 is a sectional top view of the apparatus of FIG. 1 taken along section lines 2—2.

DETAILED DESCRIPTION OF THE INVENTION

Figure 3:
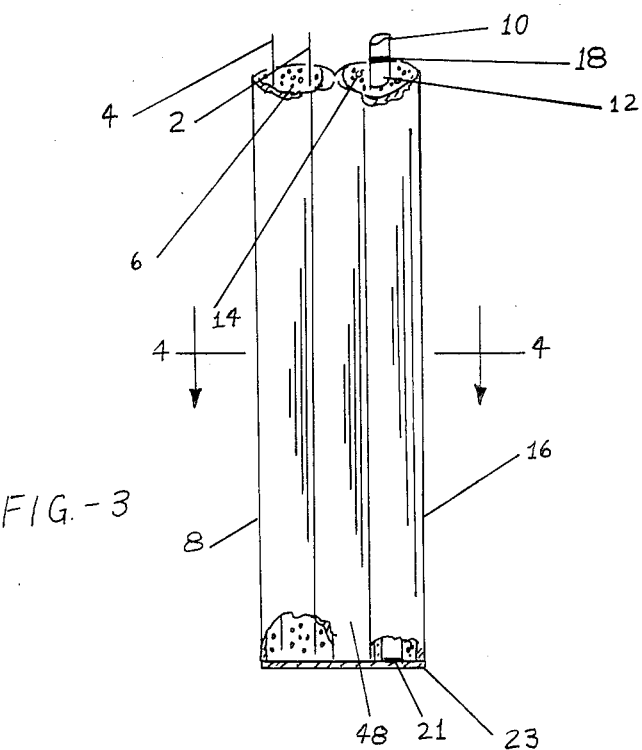
FIG. 3 is a sectional side view of the apparatus of this invention wherein a weld is used instead of an outer metallic sheath.

FIG. 1 is a sectional side view of the apparatus for the practice of the present invention and FIG. 2 is a sectional view of the apparatus of FIG. 1 taken along section lines 2—2. In FIGS. 1 and 2, thermoelectric lead 2 is a nickel-chromium alloy, and thermoelectric lead 4 is a copper-nickel alloy. The nickel-chromium alloy lead 2 and the copper-nickel alloy lead 4 are separated at every point by insulant 6. The insulant 6 provides electrical insulation between the leads 2 and 4. The insulant 6 has a negative temperature coefficient of resistance. Said thermoelectric leads 2 and 4 and insulant 6 are contained in elongated metallic sheath 8. The first terminal ends of leads 2 and 4 are electrically connected to each other through constant current source 30 and microprocessor system 36.

Said thermoelectric leads 2 and 4, constant current source 30, digital millivoltmeter 32, and microprocessor system 36 are electrically connected by leads 29, 33 and 31, respectively. The second terminal ends of leads 2 and 4 are not mechanically connected to each other. Hereafter the thermoelectric leads 2 and 4, insulant 6, and metallic sheath 8 assembly shall be referred to as a junctionless thermocouple cable (JTC).

Juxtaposed next to, in contact with, said JTC sheath 8 is resistance heater sheath 16. Resistance heater sheath 16 encompasses insulant 14 and resistance heater high resistance Nichrome lead 12, which is electrically connected to low resistance copper lead 10 at weld 18. Copper lead 10 and extended metal tube 22 are electrically to power supply 20, via electrical lead 26 which, in turn, is electrically connected to electric ground 34.

The off and on state of said power supply 20 is controlled by microprocessor system 36 through electrical cables 41. The resistance heater Nichrome lead 12 is electrically connected to the heater cable sheath 16 by weld 21. The heater Nichrome lead 12, insulant 14, and metal sheath 16 will hereafter be collectively referred to as a heater cable assembly. The heater cable assembly, JTC, and ordinary thermocouple cables 11 are swaged or drawn in extended metal tube 22, which encompasses all except a short length of the heater cable assembly sheath 16 and sheath 8 of JTC, which provide a means for first terminal ends of leads 2 and 4 to extend out of the JTC through the open end of metallic tube 22. The ordinary thermocouple cables 11 are used as filler material to avoid having air voids in the interior of metal tube 22 after the metal tube 22 has been swaged or drawn onto the JTC, heater cable assembly and ordinary thermocouple cables 11. While ordinary thermocouple cables 11 are used in the present continuous liquid level measuring device as filler material, their purpose, as filler material, could have been served with the use of solid wire. Mechanical and thermal contact between the JTC, the heater cable assembly, ordinary thermocouple cables 11 and the inner surface of metal tube 22 is achieved by swaging the metal tube 22 onto the aforementioned components. Said metallic tube 22, in addition to having one open end, has an opposite end that is terminated with end cap 24 by attaching it to the metal tube 22 using weld 26. Tank mounting means 42 is attached to the surface of metal tube 22 by weld 43.

Power supply 20 is used to supply electric current to said high resistance Nichrome lead 12 via copper lead 10. Power supply 20 provides a dc current to Nichrome lead 12 of the heater cable assembly resulting in Joule heating in the Nichrome lead 12, which, in turn, causes the JTC, thermocouple cables 11 and metal tube 22 to be raised to an elevated temperature relative to the liquid in which the metal tube 22 containing JTC, the heater cable assembly, ordinary thermocouple cables 11 are submerged. When a length of metal tube 22 heated by the heater cable assembly is uncovered, as by a change in level of the liquid in which the level measuring device is submerged, the differences in the conductivities of liquid and gas causes the metal tube 22 to experience a temperature gradient at the interface. The temperature gradient results from the differences in the thermal conductivities of gas 40 and liquid 39 which causes that portion of the level measuring device that is submerged in the liquid to be maintained at a lower temperature than the uncovered portion of the device. The temperature gradient experienced by JTC causes the insulant 6 to become conductive at that axial location; thereby forming a temporary junction which provides a current flow path between thermoelectric leads 2 and 4. The heater cable can be operated continuously or intermittently to maintain or raise the temperature of the JTC, ordinary thermocouple cables 11 and metallic tube 22 above the temperature of the liquid in which it is submerged when there is a need to determine the liquid level in a container. Constant current source 30 supplies a small electric current to thermoelectric leads 2 and 4, and the voltage dropped across the leads is measured by millivoltmeter 32.

Microprocessor system 36 monitors the electric current applied to leads 2 and 4, and the corresponding voltage drop across thermoelectric leads 2 and 4. The current and voltage values are used to determine the length of thermoelectric leads 2 and 4, above liquid-gas interface 38. In the present invention, constant current power supply 30 and a digital millivoltmeter 32 are used to measure the loop resistance of thermoelectric leads 2 and 4. This function could be performed with an ordinary digital ohmmeter whose output could be sensed with microprocessor system 36. The length of thermoelectric leads 2 and 4 above liquid-gas interface 38 is determined by using software in microprocessor system 36 which contains a look-up table of resistance values for thermoelectric leads 2 and 4 per unit length as a function of the average temperature of the materials from which the thermoelectric elements are fabricated. Therefore, knowing the temperature indicated by the temporary junction and the measured loop resistance, the distance to the temporary junction and hence the location of the liquid-gas interface 38 can be computed. Electrical power is supplied to microprocessor system 36 via power cable 46.

Figure 4:
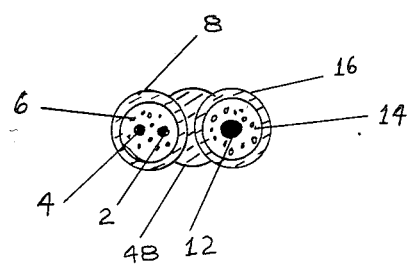
FIG. 4 is a sectional top view of the apparatus of FIG. 3 taken along section lines 4—4.

The metallic tube 22, in FIGS. 1 and 2, serves as a means of encapsulating the metal sheathed resistance heater, the JTC and the ordinary thermocouple cables 11 such that when these components are inserted into metallic tube 22 and the assembly swaged good mechanical and hence thermal contact between the aforementioned components is established. The same function could be performed by weld 48 as shown in FIGS. 3 and 4. The function of weld 48 could be performed with ordinary solder. FIG. 3 shows metallic end plate 23 which is used to seal the forward end of the level device and to provide a return path for the direct current applied to high resistance Nichrome lead 12 through metallic sheath 16.

Operation of the apparatus of FIGS. 1 and 2 will now be described in terms of the liquid-vapor interface 38 that describe the plane between liquid 38 and vapor 40 which have very different conductivities. An electric current supplied to resistance heater copper lead 10 flows into Nichrome lead 12, where it generates thermal energy by Joule heating. The thermal energy generated in the heater heats the JTC's sheath 8 and insulant 6 all along JTC's active length. That is, the thermal energy generated in the heater cable is conducted to metallic tube 22 where a steady state condition of input thermal energy from the heater cable and conduction of thermal energy into the surrounding liquid is established after a time equal to the time constant of the level detector. When the sheath 8 of the JTC is partially uncovered, the differences in fluid and vapor thermal conduction and convection characteristics cause the insulant 6, above and below the liquid-vapor interface 38, to be at different temperatures. This difference in temperature causes said insulant 6 to become electrically conductive due to its negative temperature coefficient. When insulant 6 becomes conductive a temporary junction is formed, a path for current from constant current source 30 to flow between 2 and 4 is provided, and the measurement of the voltage drop over the length of leads 2 and 4 is conducted automatically with digital millivoltmeter 32. The known input current from constant current source 30, and voltage measured by digital millivoltmeter 32, will be used to compute, with the aid of microprocessor 36, the total resistance of the leads 2 and 4, and the distance to the fluid-vapor interface 38. Once the total resistances of leads 2 and 4 are determine, the constant current source is turned off, and the temperature at the temporary junction is also measured. The temperature indicated by the electromotive force generated at the temporary junction is used to correct the resistance given in a temperature-resistance look-up table in microprocessor 36. As the fluid-vapor interface moves up or down, this same process is used to estimate the distance to the new fluid-vapor interface 38 position.

Although the invention shown in FIG. 1 contains only one thermocouple cable and one heater cable, it could be made to contain two or more thermocouples or heater cables. Leads 2 and 4 are given in FIG. 1 as nickel-copper and chromium-nickel, however, any suitable thermoelectric elements may be used.

The embodiments of the invention in which an exclusive property or privilege is claimed are defined as followed:

1. A fluid level detector comprising:
   a junctionless thermocouple cable consisting of two thermoelectric elements enclosed in a metallic sheath wherein a negative resistance temperature coefficient insulant is interpositioned between the thermoelectric elements and the inner surface of the metallic sheath thereby providing electrical insulation and thermal energy transfer between the thermoelectric elements;
   a metallic sheathed resistance heater, which is used to input thermal energy to the fluid level detector;
   an outer metallic cylindrical tube capable of being sealed on one end, into which said junctionless thermocouple cable and resistance heater are inserted and held in place by mechanically swaging or drawing, to reduce the outer diameter of said metallic cylindrical tube, thereby causing mechanical interference and thermal energy transfer between the inner surface of the outer metallic sheath, and the sheaths of said thermocouple cable and said resistance heater;
   separate means for supplying electric currents to said thermoelectric elements and to said resistance heater; and,
   electronic and computing means for measuring the loop resistance of the thermoelectric elements with a temporary junction, caused by a temperature gradient at an axial location, across an interface between a liquid and a gas in a tank, along said thermocouple cable contained in said metallic cylindrical tube, which is formed when the resistance heater is used to raise the temperature of the level measuring device above the temperature of the liquid in which it is submerged, and for estimating the distance to the temporary junction, and hence the level of fluid using the output of said resistance measuring means.

2. The device of claim 1 wherein the output voltage of the thermocouple cable is used to indicate the temperature of the thermocouple cable and used in the determination of the resistance of the thermoelectric elements per unit length at that temperature by using a look-up table programmed into said microprocessor, the look-up table contains the resistance per unit length of the thermoelectric elements used in the junctionless thermocouple cable, at several temperatures.

3. The device of claim 1 wherein said junctionless thermocouple cable and said heater cable are attached to each other as by welding to form an elongated monolithic level device.

4. The device of claim 1 wherein said junctionless thermocouple cable and said heater cable are attached lengthwise to each other as by soldering to form an elongated monolithic level device.

* * * * *